US012784707B2

(12) United States Patent
Arencibia et al.

(10) Patent No.: US 12,784,707 B2
(45) Date of Patent: Nov. 3, 2026

(54) DIMMING DEVICE ANGULAR UNIFORMITY CORRECTION

(71) Applicant: Magic Leap, Inc., Plantation, FL (US)

(72) Inventors: Ricardo Arencibia, Tamarac, FL (US); Zachary Michael Llaneras, Miami Springs, FL (US); Jason Schaefer, Parkland, FL (US); Howard Russell Cohen, Weston, FL (US); Hui-Chuan Cheng, Cooper City, FL (US); Michael Alexander Sours, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/966,688

(22) Filed: Dec. 3, 2024

(65) Prior Publication Data

US 2025/0095604 A1 Mar. 20, 2025

Related U.S. Application Data

(63) Continuation of application No. PCT/US2022/032526, filed on Jun. 7, 2022.

(51) Int. Cl.
*G09G 3/30* (2006.01)
*G02B 27/01* (2006.01)
*G09G 3/36* (2006.01)

(52) U.S. Cl.
CPC ....... *G09G 3/3696* (2013.01); *G02B 27/0172* (2013.01); *G09G 2320/0233* (2013.01); (Continued)

(58) Field of Classification Search
CPC ................. G09G 2320/068; G09G 2320/0233
See application file for complete search history.

(56) References Cited

U.S. PATENT DOCUMENTS 5,489,918 A 2/1996 Mosier
10,871,653 B1 * 12/2020 Osterman .......... G02B 27/0172
(Continued)

FOREIGN PATENT DOCUMENTS

CN 113393809 A 9/2021
JP 2001523846 A 11/2001
(Continued)

OTHER PUBLICATIONS

PCT/US2022/032526, "International Preliminary Report on Patentability", Dec. 19, 2024, 8 pages.
(Continued)

*Primary Examiner* — Sanghyuk Park
(74) *Attorney, Agent, or Firm* — KILPATRICK TOWNSEND & STOCKTON LLP

(57) ABSTRACT

A method of operating an optical system includes identifying a set of angle dependent transmittance levels for light passing through pixels of a segmented dimmer exhibiting viewing angle transmittance variations for application of a same voltage to all pixels of the segmented dimmer. The method also includes determining a set of voltages to apply to pixels of the segmented dimmer. Determining the set of voltages includes using the set of angle dependent transmittance levels. The method includes applying the set of voltages to the pixels of the segmented dimmer to achieve light transmittance through the segmented dimmer corresponding to the set of angle dependent transmittance levels.

20 Claims, 11 Drawing Sheets

(52) U.S. Cl.
CPC ............... *G09G 2320/0626* (2013.01); *G09G 2320/068* (2013.01); *G09G 2360/144* (2013.01)

(56) References Cited

U.S. PATENT DOCUMENTS

| | | | | |
|---|---|---|---|---|
| 11,170,565 | B2 | 11/2021 | Mathur et al. | |
| 2004/0252258 | A1* | 12/2004 | Matsushima | G02F 1/13471 349/96 |
| 2007/0052699 | A1 | 3/2007 | Karman et al. | |
| 2008/0198118 | A1* | 8/2008 | Choi | G09G 3/3696 345/89 |
| 2010/0060667 | A1 | 3/2010 | Chen et al. | |
| 2014/0055692 | A1* | 2/2014 | Kroll | G02B 30/20 29/846 |
| 2015/0172631 | A1* | 6/2015 | Kasahara | H04N 13/271 348/46 |
| 2017/0176753 | A1 | 6/2017 | Shi et al. | |
| 2020/0233246 | A1* | 7/2020 | Lim | G02C 7/101 |
| 2020/0409149 | A1 | 12/2020 | Osterman et al. | |
| 2021/0103149 | A1 | 4/2021 | Osterman et al. | |
| 2024/0427181 | A1* | 12/2024 | Ohira | G02F 1/1323 |

FOREIGN PATENT DOCUMENTS

| | | | |
|---|---|---|---|
| JP | 2007513360 | A | 5/2007 |
| WO | 2023239354 | A1 | 12/2023 |

OTHER PUBLICATIONS

PCT/US2022/032526, “International Search Report and the Written Opinion”, Nov. 21, 2022, 9 pages.

EP22970376.4, “Extended European Search Report”, Dec. 5, 2025, 17 pages.

JP2024-571939, “Office Action and English translation”, Apr. 28, 2026, 10 pages.

* cited by examiner

DIMMING DEVICE ANGULAR UNIFORMITY CORRECTION

This application is a continuation of International Patent Application No. PCT/US2022/032526, filed Jun. 7, 2022, entitled "DIMMING DEVICE ANGULAR UNIFORMITY CORRECTION," the entire disclosure of which is hereby incorporated by reference, for all purposes, as if fully set forth herein.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to techniques for improving optical systems in varying ambient light conditions. More particularly, embodiments of the present disclosure provide systems and methods for operating an augmented reality (AR) device comprising a dimming element in order to compensate for angular transmittance variations of the dimming element. Although the present invention is described in reference to an AR device, the disclosure is applicable to a variety of applications in computer vision and image display systems.

In an aspect, described herein are methods of operating an optical system. In some examples, methods of this aspect comprise identifying a set of angle dependent transmittance levels for light passing through pixels of a segmented dimmer, the segmented dimmer exhibiting viewing angle transmittance variations for application of a same voltage to all pixels of the segmented dimmer; determining a set of voltages to apply to pixels of the segmented dimmer, wherein determining the set of voltages includes using the set of angle dependent transmittance levels; and applying the set of voltages to the pixels of the segmented dimmer of the optical system to achieve light transmittance through the segmented dimmer corresponding to the set of angle dependent transmittance levels, such as to allow for predictability and/or uniformity in transmittance across angles. In some examples, different types of segmented dimmers may be used with the systems and methods described herein. For example, the segmented dimmer may comprise an electrically controlled birefringence liquid crystal panel. The segmented dimmer may exhibit viewing or transmission angle transmittance variations that are symmetric or asymmetric.

In some examples, determining the set of voltages comprises determining receipt coordinates associated with the pixels of the segmented dimmer and rendering the set of voltages using one or more lookup tables based on the receipt coordinates. For example, each lookup table may be associated with a corresponding angle dependent transmittance level or linear range of transmissions. As another example, a lookup table may contain coefficients that represent a particular transmission level that are stored for discrete angular locations, which can be used to generate the desired set voltages to apply to pixels of the segmented dimmer. Using appropriately constructed lookup tables, voltages for achieving target transmittance levels can be determined for application to the pixels of the segmented dimmer despite variations that may occur due to angular transmission non-uniformities.

As used herein, receipt coordinates may optionally include one or more distance coordinates or one or more angular coordinates. For example, receipt coordinates may include Cartesian coordinates (e.g., X, Y coordinates) or one or more angles corresponding to transmission angles through pixels of the segmented dimmer, such as a vertical transmission angle and a horizontal transmission angle. Optionally, methods of this aspect further comprise identifying an eye position for collecting light transmitted through the segmented dimmer. In some examples, determining the set of voltages includes using the set of angle dependent transmittance levels and the eye position. By determining an eye position (e.g., a receipt position for light transmitted through pixels of the segmented dimmer) the receipt coordinates can be determined for each pixel, such as a pair of transmission angles (e.g., horizontal and vertical transmission angles) for each pixel. For each pixel, the angles may be applied to or otherwise used with one or more lookup tables associated with angle dependent transmittance levels to determine output voltage to apply to the pixels. In examples, a set of voltages comprises voltages for each of the pixels of the segmented dimmer. Optionally, to achieve uniform dimming across the segmented viewer, the set of angle dependent transmittance levels is the same level for all pixels of the segmented dimmer. Optionally, the set of angle dependent transmittance levels includes independent transmittance levels for different pixels of the segmented dimmer, which may be useful for achieving different dimming levels for different regions of the segmented dimmer. In some cases, identifying the set of angle dependent transmittance levels comprises identifying a bias level, offset level, or normalization factor for pairing the set of angle dependent transmittance levels to transmittance levels associated with a different segmented dimmer of a different optical system. Such a bias level, offset level, or normalization factor may be useful for ensuring that different segmented dimmers (e.g., for left and right eyes of a user) may be appropriately matched with one another to reduce dichoptic luminance errors.

Optionally, methods of this aspect may comprise or further comprise determining a temperature of the segmented dimmer, wherein determining the set of voltages includes using the set of angle dependent transmittance levels and the temperature. For example, the angular transmission non-uniformities of a segmented dimmer may be different at different temperatures. Optionally, each lookup table is associated with a corresponding angle dependent transmittance level and a corresponding temperature or temperature range. In this way, voltages for achieving target transmittance levels can be determined for application to the pixels of the segmented dimmer despite variations that may occur due to angular transmission non-uniformities or temperature fluctuations. In some examples, determining the set of voltages comprises determining receipt coordinates associated with the pixels of the segmented dimmer and rendering the set of voltages using one or more lookup tables based on the receipt coordinates.

Methods of this aspect may comprise or further comprise, for each of a plurality of different angle dependent transmittance levels, generating a lookup table providing voltage outputs for different pixels of the segmented dimmer as a function of receipt coordinates of light transmitted through the different pixels of the segmented dimmer to achieve the angle dependent transmittance level. Such a lookup table may be generated as a calibration step, for example, for the segmented dimmer and may be performed prior to assembly of the segmented dimmer into a display system or after assembly into a display system.

Optionally, methods of this aspect may comprise or further comprise, for each of a plurality of different angle dependent transmittance levels and different temperatures, generating a lookup table providing voltage outputs for different pixels of the segmented dimmer as a function of receipt coordinates of light transmitted through the different pixels of the segmented dimmer and temperature to achieve the angle dependent transmittance level. The segmented dimmer can include liquid crystals that exhibit angular non-uniform transmittance effects. The segmented dimmer can exhibit viewing angle transmittance variations that are symmetric or asymmetric. Identifying the set of angle dependent transmittance levels can include identifying a bias level, offset level, or normalization factor for reducing dichoptic luminance errors or for pairing the set of angle dependent transmittance levels to transmittance levels associated with a different segmented dimmer of a different optical system. The method can further include determining a temperature of the segmented dimmer, wherein determining the set of voltages includes using the set of angle dependent transmittance levels and the temperature. Determining the set of voltages can include determining receipt coordinates associated with the pixels of the segmented dimmer and rendering the set of voltages using one or more lookup tables based on the receipt coordinates, wherein a lookup table is associated with a corresponding angle dependent transmittance level at the temperature.

In another aspect, provided herein are optical systems. An optical system example of this aspect may comprise a segmented dimmer including a plurality of pixels, the segmented dimmer exhibiting viewing angle transmittance variations for application of a same voltage to all pixels of the segmented dimmer; a voltage controller in electrical communication with the segmented dimmer and configured to provide a set of voltages to pixels of the segmented dimmer to control transmittance levels for light passing through the pixels of the segmented dimmer. Optionally, a set of voltages comprises voltages for each of the pixels of the segmented dimmer. Optionally, the segmented dimmer comprises an electrically controlled birefringence liquid crystal panel.

Optionally, optical systems of this aspect may comprise or further comprise one or more processors. For example, the one or more processors may be programmed with instructions that, when executed, cause the one or more processors to perform operations including identifying a set of angle dependent transmittance levels for light passing through pixels of the segmented dimmer; determining a set of voltages to apply to pixels of the segmented dimmer, wherein determining the set of voltages includes using the set of angle dependent transmittance levels; and controlling the voltage controller to apply the set of voltages to the pixels of the segmented dimmer of the optical system.

In some examples, determining the set of voltages comprises determining receipt coordinates associated with the pixels of the segmented dimmer and rendering the set of voltages using one or more lookup tables based on the receipt coordinates, wherein a lookup table is associated with a corresponding angle dependent transmittance level. Optionally, the receipt coordinates include one or more distance coordinates or one or more angular coordinates.

In some examples, the operations may include or further include identifying a receiver position for collecting light transmitted through the segmented dimmer, such as where determining the set of voltages includes using the set of angle dependent transmittance levels and the receiver position. Optionally, the receiver position corresponds to an eye position of a user of the optical system. In some examples, determining the set of voltages includes identifying angles for each pixel of the segmented dimmer based on the eye position of the user, and for each pixel, applying the angles to a lookup table associated with an angle dependent transmittance level for the pixel to determine an output voltage to apply to the pixel.

In some examples, the set of angle dependent transmittance levels is the same level for all pixels of the segmented dimmer. In other examples, the set of angle dependent transmittance levels includes independent transmittance levels for different pixels of the segmented dimmer. Optionally, identifying the set of angle dependent transmittance levels comprises identifying a bias level, offset level, or normalization factor for pairing the set of angle dependent transmittance levels to transmittance levels associated with a different segmented dimmer of a different optical system. For example, it may be desirable for transmittance levels used for a left eye and a right eye to be appropriately matched to avoid user discomfort. In some examples, to achieve uniformity among different segmented dimmers, values in one or more lookup tables can be normalized to one another across an entire range of transmittance levels for all angular values to reduce perceived differences in transmittance levels. It may further be desirable to adjust bias level, offset level, or normalization factor across a population of different segmented dimmers to allow for uniformity across devices.

In some examples, the operations further include determining a temperature of the segmented dimmer. Optionally, determining the set of voltages includes using the set of angle dependent transmittance levels and the temperature. Optionally, determining the set of voltages comprises determining receipt coordinates associated with the pixels of the segmented dimmer and rendering the set of voltages using one or more lookup tables based on the receipt coordinates, wherein a lookup table is associated with a corresponding angle dependent transmittance level at the temperature. The operations can further include: identifying a receiver position for collecting light transmitted through the segmented dimmer, wherein determining the set of voltages includes using the set of angle dependent transmittance levels and the receiver position. The receiver position can corresponds to an eye position of a user of the optical system. The segmented dimmer can include liquid crystals that exhibit angular non-uniform transmittance effects. The set of angle dependent transmittance levels can be a same level for all pixels of the segmented dimmer. The set of angle dependent transmittance levels can include independent transmittance levels for different pixels of the segmented dimmer.

Numerous benefits are achieved by way of the present disclosure over conventional techniques. For example, operating a dimming element according to the techniques described herein allow for more uniform dimming across a user's field of view, reduction of angular transmittance variations across different dimmed regions, and reduction in dichoptic luminance mismatches (e.g., left/right eye mismatches). Embodiments of the present invention allow for AR and virtual reality (VR) capabilities in a single device by using the segmented dimmer to attenuate the world light according to dimming levels that match target dimming levels despite the dimming device exhibiting angular transmittance non-uniformities. Other benefits of the present disclosure will be readily apparent to those skilled in the art.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

Figure 1:
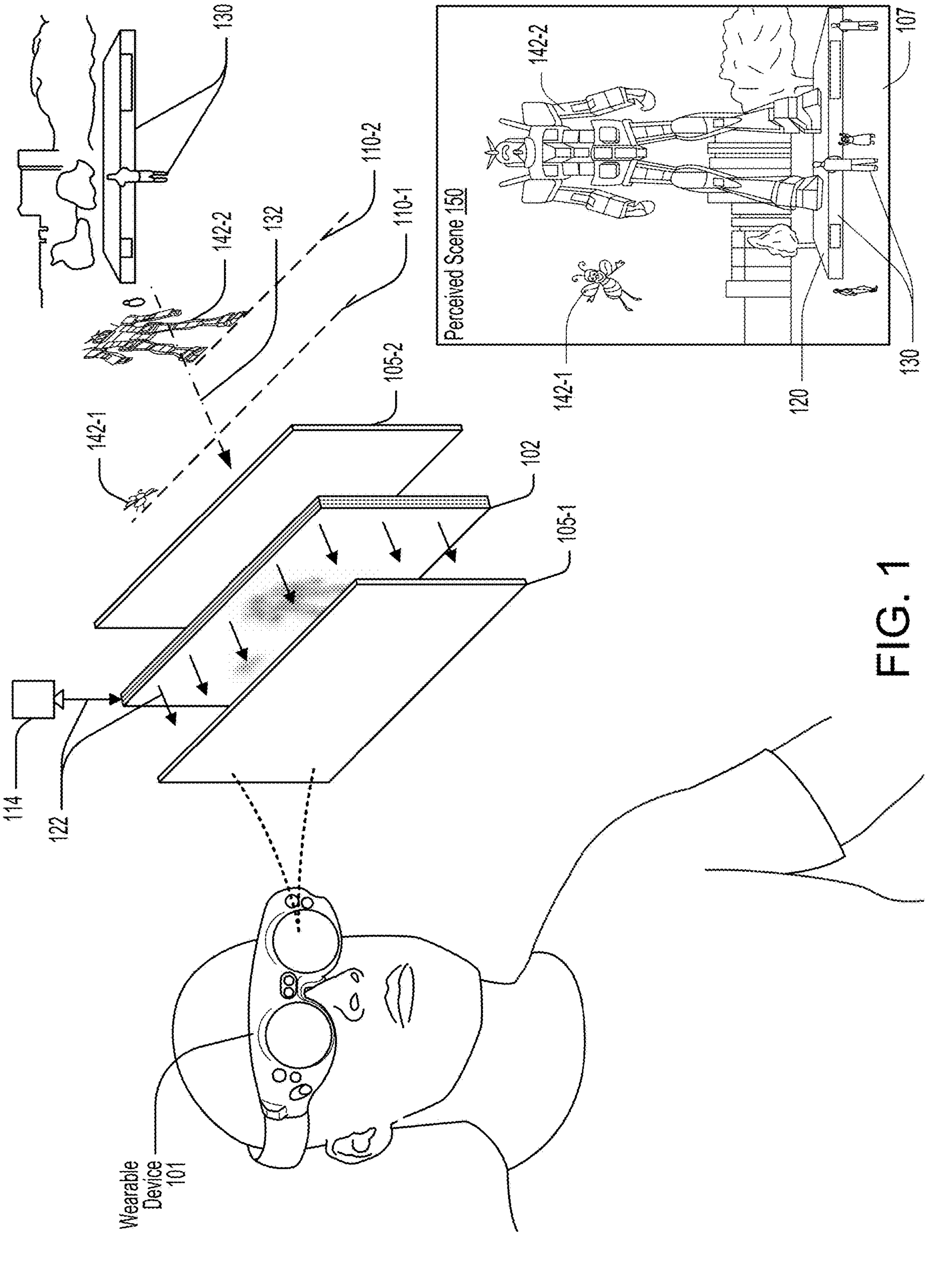
FIG. 1 illustrates a wearable device and a corresponding scene as viewed through a wearable device.

Wearable optical systems and devices, such as optical see through (OST) augmented reality (AR) devices, can be difficult to operate in extreme light conditions. For example, when a bright light source (e.g., the sun) is present, the light source can irritate the user's eyes and darker areas in the device's field of view become difficult for the user to see. Furthermore, when virtual content is being displayed at a wearable optical system, the virtual content that overlaps with the bright light source can be overpowered by the world light associated with the bright light source, while the virtual content displayed elsewhere in the device's field of view may be unobservable due to the potential irritation to the user's eyes due to the world light.

Embodiments and examples described herein solve these and other problems by dimming the world light at different spatial locations within the device's field of view using segmented dimmers (e.g., left and right segmented dimmers) in front of the user's eyes. As examples, segmented dimmers may employ liquid crystal technology, such as an electrically controlled birefringence (ECB) liquid crystal display, where voltages are applied across pixels of an ECB liquid crystal display to reduce the transmitted light. A segmented dimmer may also be referred to as a pixelated dimmer in that it may comprise a plurality of pixels or different regions which may be independently dimmed.

However, segmented dimmers may exhibit angular transmittance variations for application of the same voltage across all pixels. That is, for a fixed voltage applied to a pixel of a segmented dimmer, the amount of light transmitted through the pixel can vary as a function of transmission angle. Such angular variations may give rise to undesired artifacts, such as observed dimming of transmitted light in different regions of the dimmer more than desired or less than desired. Aspects described herein reduce angular variations in transmittance by applying voltages to pixels of a segmented dimmer that are different than the voltages that would be nominally used to achieve a particular transmittance level, such as for on-axis transmission of light. The voltages applied to the pixels of the segmented dimmer can be selected so as to achieve a target observed transmittance level using a set of preconfigured and/or calibrated voltages that take into consideration the angular dependence of transmittance for the dimmer.

In the following description, various embodiments and examples will be described. For purposes of explanation, specific configurations and details are set forth in order to provide a thorough understanding of the embodiments and examples. However, it will also be apparent to one skilled in the art that the embodiments and examples may be practiced without the specific details. Furthermore, well-known features may be omitted or simplified in order not to obscure the embodiments and examples being described.

Some of the figures herein follow a numbering convention in which the first digit or digits correspond to the figure number and the remaining digits identify an element or component in the figure. Similar elements or components between different figures may be identified by the use of similar digits. For example, 101 may reference element "101" in FIG. 1, and a similar element may be referenced as 201 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates a wearable device 101 and a corresponding scene 150 as viewed through wearable device 101 (e.g., a head-mounted display device), according to some embodiments of the present disclosure. Scene 150 is depicted wherein a user of an AR technology sees a real-world park-like setting 107 featuring various real-world objects 130 such as people, trees, buildings in the background, and a real-world concrete platform 120. In addition to these items, the user of the AR technology also perceives that they "see" various virtual objects 142 such as a robot statue 142-2 standing upon the real-world concrete platform 120, and a cartoon-like avatar character 142-1 flying by, which seems to be a personification of a bumble bee, even though these elements (character 142-1 and statue 142-2) do not exist in the real world. Due to the extreme complexity of the human visual perception and nervous system, it is challenging to produce a virtual reality (VR) or AR technology that facilitates a comfortable, natural-feeling, rich presentation of virtual image elements amongst other virtual or real-world imagery elements.

During operation, a projector 114 of wearable device 101 may project virtual image light 122 (e.g., light associated with virtual content) onto an eyepiece 102 of wearable device 101, which may cause a light field (e.g., an angular representation of virtual content) to be projected onto a retina of a user's eye in a manner such that the user perceives the corresponding virtual content as being positioned at some location within an environment of the user. For example, virtual image light 122 injected into eyepiece 102 and outcoupled by eyepiece 102 toward the user's eye may cause the user to perceive character 142-1 as being positioned at a first virtual depth plane 110-1 and statue 142-2 as being positioned at a second virtual depth plane 110-2. The user perceives the virtual content along with world light 132 corresponding to one or more world objects 130, such as platform 120.

In some embodiments, wearable device 101 may include various lens assemblies, waveguides, diffraction elements, or other optical structures. In the illustrated example, wearable device 101 includes a first lens assembly 105-1 positioned on the user side of eyepiece 102 (the side of eyepiece 102 closest to the eye of the user) and a second lens assembly 105-2 positioned on the world side of eyepiece 102 (the side of eyepiece 102 furthest from the eye of the user). Each of first lens assembly 105-1 and second lens assembly 105-2 may be configured to apply optical power to the light passing therethrough to converge and/or diverge light in a desired manner. While FIG. 1 shows a single projector 114 and single corresponding optical stack (including eyepiece 102 and lens assemblies 105), it is to be understood that wearable device 101 may include an optical stack for each eye with a single or multiple projectors configured to inject virtual image light into the respective optical stack(s).

Figure 2:
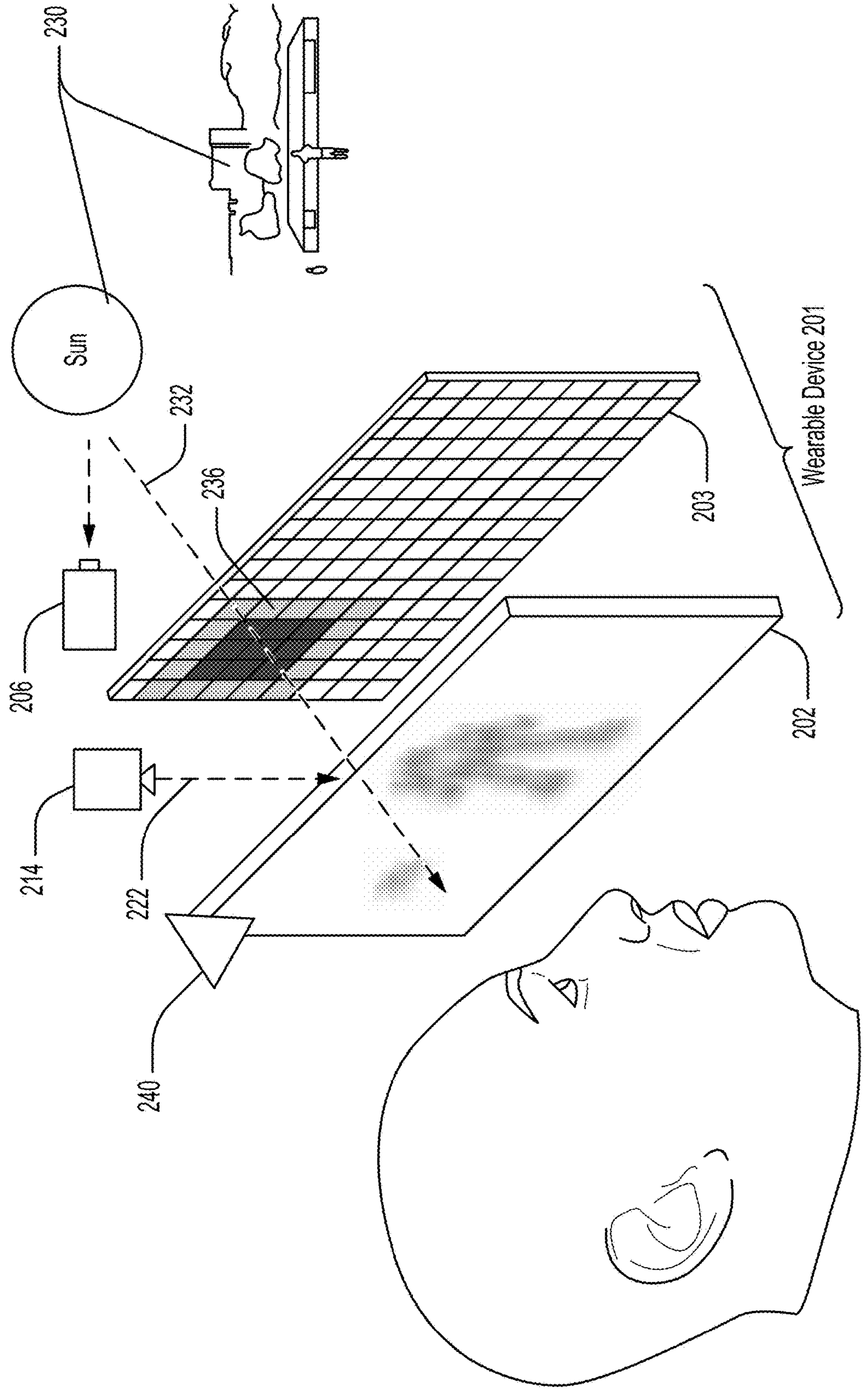
FIG. 2 illustrates an example wearable device incorporating a segmented dimmer in alignment with an eyepiece.

FIG. 2 illustrates an example wearable device 201 incorporating a segmented dimmer 203 (or simply "dimmer") in alignment with an eyepiece 202, according to some embodiments of the present disclosure. In some embodiments, segmented dimmer 203 may be transparent or semi-transparent when wearable device 201 is in an inactive mode or an off mode such that a user may view one or more world objects 230 when looking through eyepiece 202 and segmented dimmer 203. As illustrated, eyepiece 202 and segmented dimmer 203 may be arranged in a side-by-side configuration and may form a device field of view that a user sees when looking through eyepiece 202 and segmented dimmer 203. Although FIG. 2 illustrates a single eyepiece 202 and a single segmented dimmer 203 (for illustrative reasons), it is to be understood that wearable device 201 may include two eyepieces and two dimmers, one for each eye of a user.

During operation, segmented dimmer 203 may be adjusted to reduce an intensity of a world light 232 associated with world objects 230 impinging on segmented dimmer 203, thereby producing a dimmed area 236 within the system field of view. Dimmed area 236 may be a portion or subset of the device field of view, and may be partially or completely dimmed. Segmented dimmer 203 may be adjusted according to a plurality of spatially-resolved dimming values, which includes dimming values for dimmed area 236. Furthermore, during operation of wearable device 201, projector 214 may project a virtual image light 222 (e.g., light associated with virtual content) onto eyepiece 202 which may be observed by the user along with world light 232. As described in reference to FIG. 1, projecting virtual image light 222 onto eyepiece 202 may cause a light field to be projected onto the user's retina in a manner such that the user perceives the corresponding virtual content as being positioned at some location within the user's environment.

In some embodiments, wearable device 201 may include a camera 206 (alternatively referred to as a "light sensor") configured to detect world light 232 and to produce a corresponding image (alternatively referred to as a "brightness image"). In one example, wearable device 201 may include left and right cameras (e.g., camera 206) positioned near left and right dimmers (e.g., segmented dimmer 203), respectively. For each of the left and right sides, camera 206 may be positioned such that world light 232 detected by camera 206 is computationally relatable to the world light 232 that impinges on the respective (left or right) segmented dimmer 203 and/or eyepiece 202. As described herein, the brightness images captured by the left and right cameras (alternatively referred to as "left brightness image" and "right brightness image", respectively) may be combined and analyzed in such a way that left and right 2D brightness maps that directly correspond to the surfaces of the left and right dimmers and/or the perspectives of the user's left and right eyes, respectively, may be generated.

In the illustrated example, the dimming values for segmented dimmer 203 are computed so as to align dimmed area 236 with world light 232 associated with the sun, thereby protecting the user's eyes and improving the AR experience. Specifically, camera 206 may detect world light 232 associated with the sun, which may be used to further determine a direction and/or a portion of the device field of view at which world light 232 associated with the sun passes through segmented dimmer 203. In response, segmented dimmer 203 may be adjusted to set dimmed area 236 to cover a portion of the device field of view corresponding to the detected world light. As illustrated, segmented dimmer 203 may be adjusted so as to reduce the intensity of world light 232 at the center of dimmed area 236 at a greater amount than the extremities of dimmed area 236.

In some examples of AR device 200, dimmed area 236 or a dimming level for dimmed area 236 is determined based on eye position information of an eye of a user. For example, gaze or eye position information may be detected by an eye tracker 240 mounted to AR device 200 and segmented dimmer 203 may be adjusted to set a position of dimmed area 236 and/or a dimming level of dimmed area 236 based on the detected eye position and/or gaze. In some examples, eye position may be determined as a center position of an eye, which may not change or may not change significantly when gaze changes.

Figure 3:
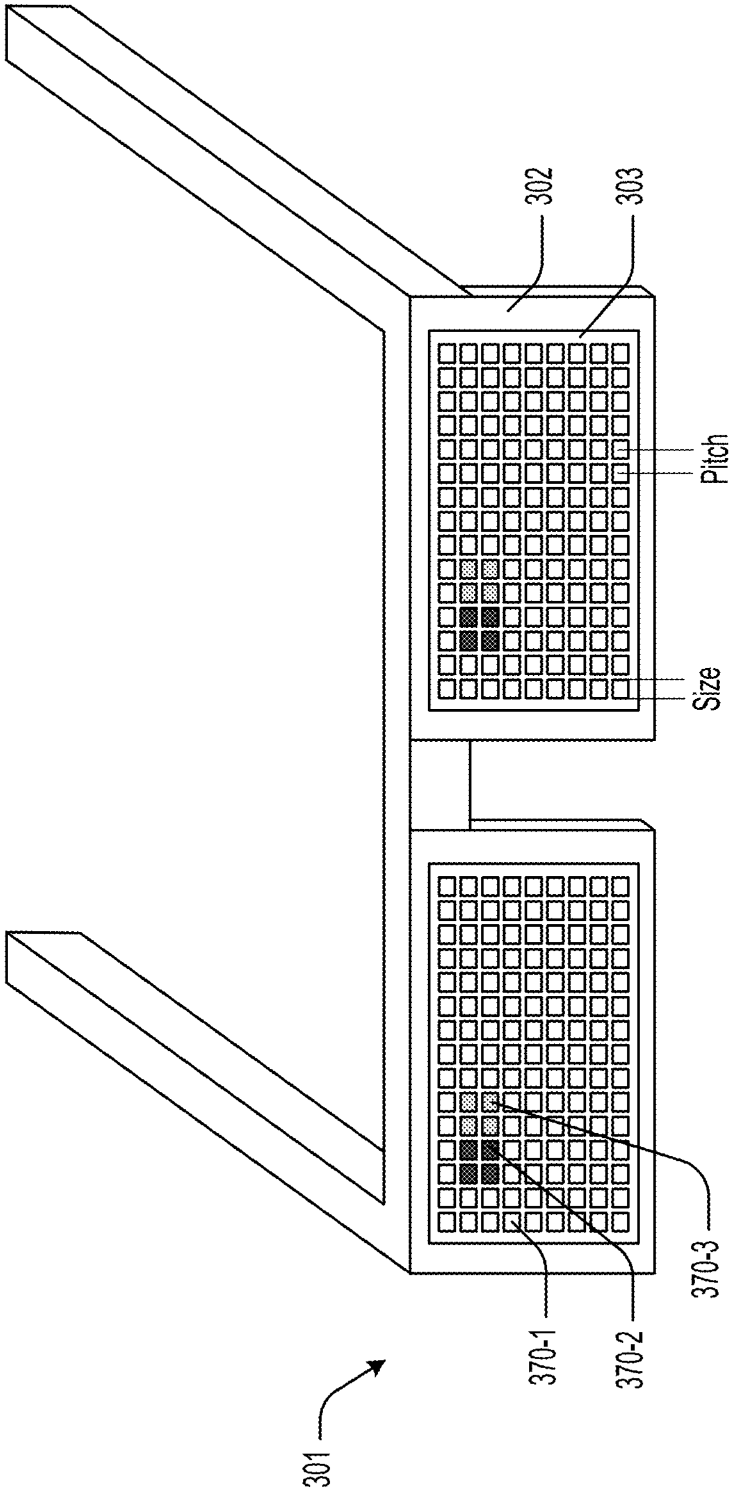
FIG. 3 illustrates an example wearable device with an eyepiece and a pixelated dimming element consisting of a spatial grid of dimming areas.

FIG. 3 illustrates an example wearable device 301 with an eyepiece 302 and a pixelated dimming element (e.g., dimmer 303) for each of the left and right sides of wearable device 301, according to some examples of the present disclosure. Each dimmer 303 may include a spatial grid of dimming areas (e.g., pixels 370) that can have various levels of transmittance or dimming. Each of pixels 370 may have an associated size (e.g., width) and an associated spacing (e.g., pitch). It is to be understood that the quantity of pixels 370 in each dimmer 303 may be greater or less than the illustrated example (e.g., each dimmer 303 may include a 1028×1028 grid of pixels, a 500×1000 grid of pixels, a 50×50 grid of pixels etc.). As illustrated, the spatial grid of dimming elements may include one or more clear pixels 370-1 providing complete or maximum transmission of incident light, one or more fully dark pixels 370-2 providing complete dimming or minimum transmission of incident light, and one or more intermediate dark pixels 370-3 providing partial dimming of incident light.

Adjacent pixels 370 within dimmer 303 may be bordering (e.g., when the pitch is equal to the size) or may be separated by gaps (e.g., when the pitch is greater than the size). In various embodiments, dimmer 303 may employ liquid crystal technology such as dye doped or guest host liquid crystals, twisted nematic (TN) or vertically aligned (VA) liquid crystals, or ferroelectric liquid crystals. In some embodiments, dimmer 303 may comprise an electrochromic device. In some implementations, dimmer 303 may employ electrically controlled birefringence (ECB) technology, such as an ECB cell, among other possibilities.

In use, pixels 370 within dimmer 303 may all be controlled to have the same transmittance level, such as a fully clear or non-dimming character, a fully dark or complete dimming character, or a partial transmittance character, or the pixels 370 may be controlled to different or independent transmittance levels. As used herein, a transmittance level, also referred to as a dimming level, may correspond to a transmission, transmittance, or transmissivity of a pixel in a dimmer, and may represent the fraction of incident light that is transmitted through the pixel and reach a receiver, such as the eye of a user, such as 100%, 0%, or transmittance values greater than 0% and less than 100%. As described herein in further detail, transmittance levels may be different for on-axis transmission of light, such as where the transmitted light has a direction perpendicular to the plane of the dimmer, and for off-axis transmission of light. In examples herein, transmittance may represent relative transmittance with respect to a maximum transmittance (defined as 100%) and a minimum transmittance (defined as 0%). Transmittance levels may be set or adjusted for a pixel of a dimmer by applying a voltage across the pixel (e.g., a voltage difference being applied between electrodes of the pixel). In some cases, the light transmitted on-axis through the dimmer in the fully clear state may be set at or defined at 100% transmittance (corresponding to maximum transmittance through the dimmer) even though some amount of light may be scattered and/or absorbed by the dimmer. In some examples, a voltage of zero volts (0 V) may be applied to achieve a fully clear or 100% on-axis transmittance level.

In some segmented dimmers, such as those employing ECB technology, the actual transmittance value through pixels of the dimmer may exhibit angular non-uniformities and further the angular-non uniformity may be asymmetric. That is, the transmittance value may not be uniform across all incidence/transmission angles and transmittance observed at positive or negative transmission angles relative to on-axis transmission may be different. For example, a pixel or portion of a dimmer that is observed from one angle can appear to have a lower or higher transmittance when observed from a different angle. Further, the angular non-uniformity may vary based on the voltage applied across the pixel.

Figure 4:
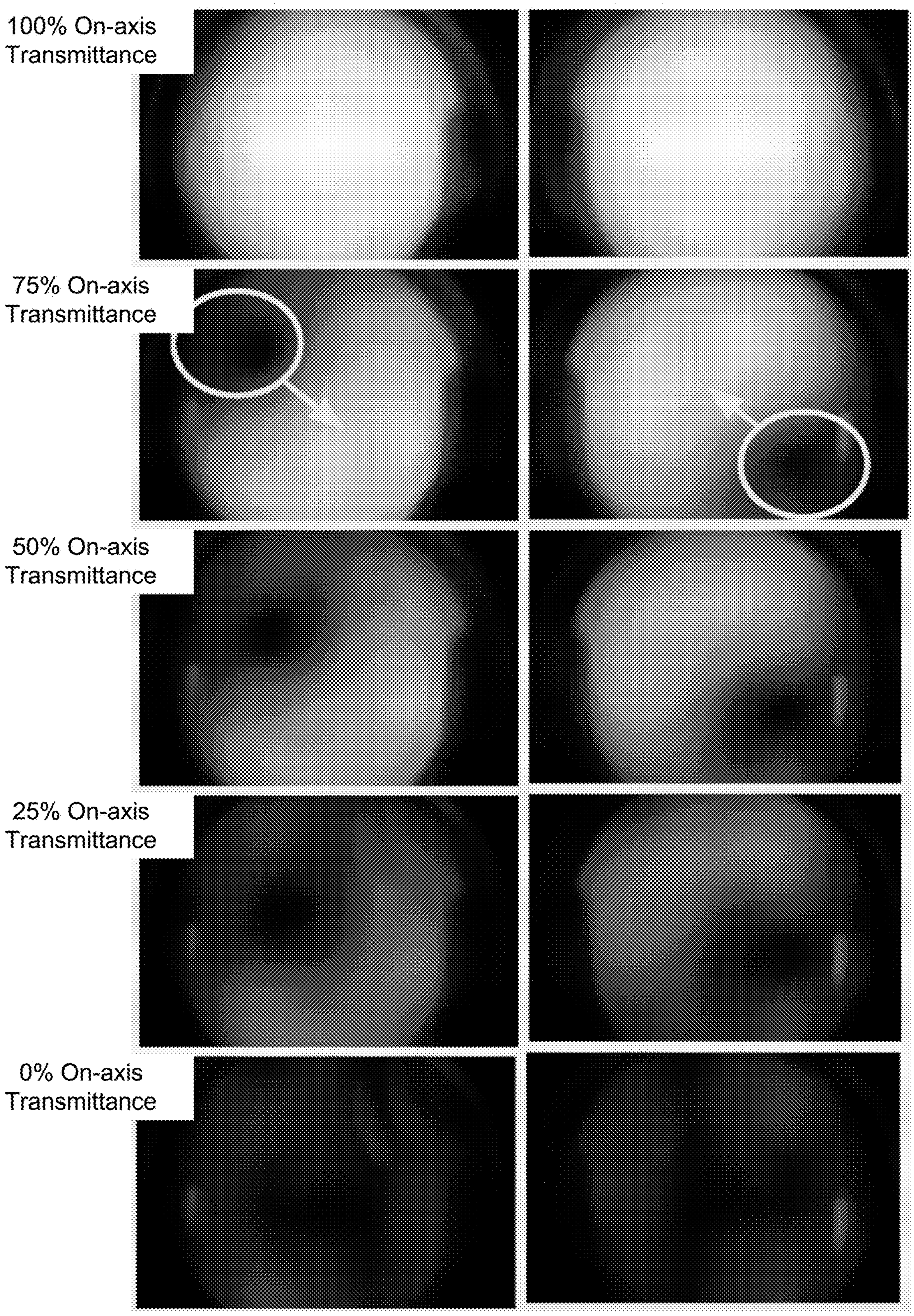
FIG. 4 provides photographs of a segmented dimmer at different transmittance levels, showing angular non-uniform transmittance effects.

FIG. 4 shows photographs of a pair of segmented dimmers (e.g., having an 80×80 grid of pixels) positioned in front of a bright white background and captured from a camera position that is directly on-axis with the center of the dimmer (e.g., the light transmitting through the center of the dimmer is perpendicular to the plane of the dimmer). The same voltage is applied to all pixels of the dimmers, such that the pixels exhibit the same on-axis transmittance, with different voltages used for each row in FIG. 4 to achieve different nominal or on-axis transmission levels. Individual pixels of the dimmer are not evident in the photographs shown in FIG. 4. Note that some artifacts are observed at the right and left edges of the dimmers shown in FIG. 4 (e.g., due to reflections or obscured regions). The top row of FIG. 4 shows application of a first voltage to all pixels of the dimmers, which may correspond to a 100% transmittance level for on-axis transmission, showing little observed angular transmittance variation across the dimmer. The second row in FIG. 4 shows application of a second voltage to all pixels of the dimmer, which may correspond to a lower transmittance level for on-axis transmission, where angular variations are observed, as indicated by the circled regions. For example, a portion of the left dimmer in the top left quadrant and a portion of the right dimmer in the bottom right quadrant exhibit relatively low observed transmittance while other portions of the dimmers exhibit a more uniform and relatively high observed transmittance. The third row in FIG. 4 shows application of a third voltage to all pixels of the dimmer, and the fourth row in FIG. 4 shows application of a fourth voltage to all pixels of the dimmer, showing migration of the low observed transmission region towards the center of the dimmers as transmittance is reduced, as represented by the arrows in the second row in FIG. 4. The bottom row in FIG. 4 shows application of a fifth voltage to all pixels of the dimmers, which may correspond to a 0% transmittance level for on-axis transmission, where further angular variations are observed. For example, a portion of the dimmer near the center exhibits a relatively low, zero, or near-zero observed transmittance while other portions of the dimmer towards the edges of the dimmer show a higher and non-zero observed transmittance.

Such angular variations in observed transmittance for the same application of voltage across all pixels of the dimmer can give rise to undesired artifacts, such as dimming world light more than desired or less than desired and difficulty in properly applying desired dimming to different areas of the dimmer. Such angular variations can impact the usability of a segmented dimmer when incorporated into a head-mounted AR device, and contribute to eye strain or other undesired effects. However, angular variations in observed transmittance can be reduced by applying voltages to pixels of a segmented dimmer to achieve a target observed transmittance that may be different from the on-axis transmittance for the pixels. For example, in the case of a uniform target transmittance level across all pixels, different voltages can be applied to different pixels in such a way that the observed transmittance level more closely matches the target transmittance level than if the same voltage was applied across all pixels. In the case of the middle row of FIG. 4, where a uniform transmittance of 50% may be desired, for example, the relatively dark pixels at the upper left (left image) and lower right (right image) quadrants can have smaller voltages applied, such that those pixels actually exhibit higher than 50% on-axis transmittance, but provide an observed 50% transmittance at the position at which the transmitted light is received (e.g., by an eye of a user).

Figure 5:
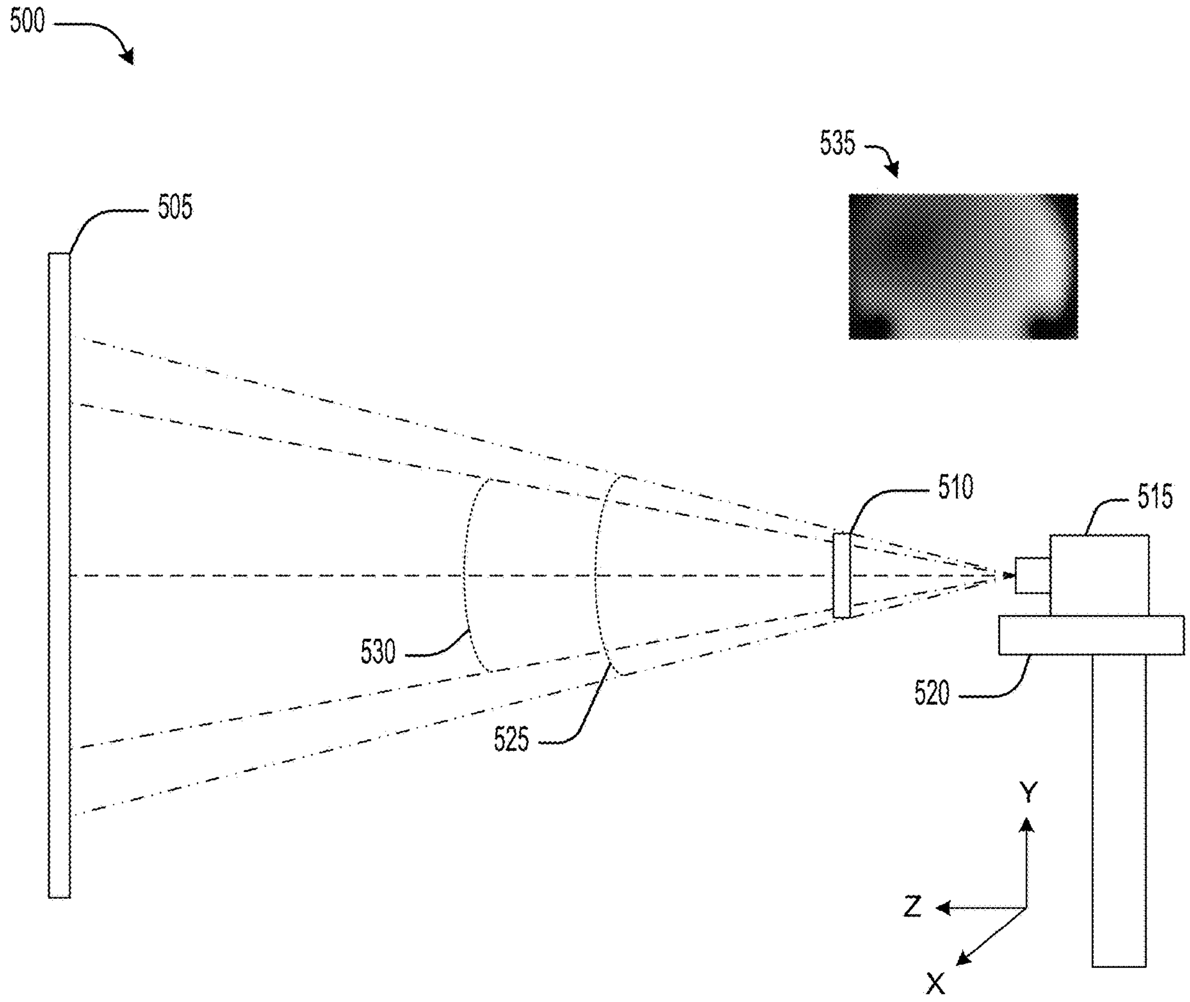
FIG. 5 provides a schematic illustration of a data collection system for measuring transmittance as a function of collection angle through a segmented dimmer.

To quantify and determine appropriate voltages to apply to pixels of a segmented dimmer to achieve observed transmittance levels that accord with a target transmittance level, a data collection configuration 500 shown in FIG. 5 was developed. The data collection configuration 500 includes an LED panel 505, providing a uniform bright white background, an optical stack 510 including a segmented dimmer, and a camera 515 mounted on a 3-axis translation stage 520. The zero position of camera 515 is adjusted such that an angle of view (AOV) 525 of camera 515 is filled by the optical stack 510. The AOV 530 of an eye of a user is shown for reference, and assumed to be smaller than the AOV 525 of camera 515. In the example shown in FIG. 5, the AOV 525 of camera 515 is about 67°, while the AOV 530 of an eye of a user is shown as about 60°. In other examples, the AOV of the camera and/or the eye of the user can be larger than these values.

During data collection, the segmented dimmer of the optical stack 510 is adjusted to different on-axis transmission levels and luminance images, representing the observed transmittance, are collected by camera 515. An inset image 535 at the top right of FIG. 5 shows an example of a luminance image collected by camera 515 when the segmented dimmer of the optical stack 510 is set to a relatively low on-axis transmittance level (e.g., 25% or less). Additionally the XYZ-positions of camera 515 are adjusted using translation stage 520 to vary the transmission angles of light passing from LED panel 505 through optical stack 510 and collected at camera 515. For variations in only Z-position (e.g., distance between camera 515 and optical stack 510), the observed angular variations in transmittance do not appear to change, but a zoom factor is perceived as the optical stack 510 is closer or further away from the camera depending on Z-position. For variations in Y-position and/or X-position, corresponding to a change in eye lateral positions, the observed variations in transmittance appear to be relatively similar, but shifted with respect to the position of the optical stack 510. This observation may confirm that the variations in observed transmittance are angle-dependent rather than position-dependent.

To calibrate a large field of view to allow for adjustment of eye lateral position, a variety of techniques can be used. In one example, observed transmittance data is collected at different X- and Y-positions of the camera 515 and the data are stitched together to provide an expanded set of observed transmittance data that can take into account shift in receipt position of transmitted light. For example, a plurality of positions (e.g., 4 or more or 5 or more) of the camera 515 can be used, such as a position on-axis with the center of the optical stack 510 and/or one or more positions on-axis with an upper-left quadrant of optical stack 510, an upper-right quadrant of optical stack 510, a lower-left quadrant of optical stack 510, and a lower-right quadrant of optical stack 510. In another example, a wider field of view camera can be used, which can result in a configuration where translations of the camera 515 are not needed and thus no stitching of data is needed. Use of a wider field of view camera can, however, result in some distortions, such that distortion correction may need to be applied to the obtained images. In one example, displaying and observing a known dot pattern on the optical stack 510 can be used to identify the distortion correction needed. As another example, the observed transmittance data can be collected at different X- and Y-positions of the camera 515, as described above, but instead of stiching the data together, a known dot pattern dot pattern applied to the optical stack 510 can be used to identify camera position and/or pose, allowing angular coordinates and transmittance data to be referenced to the same coordinate system without requiring stitching of data.

Figure 6:
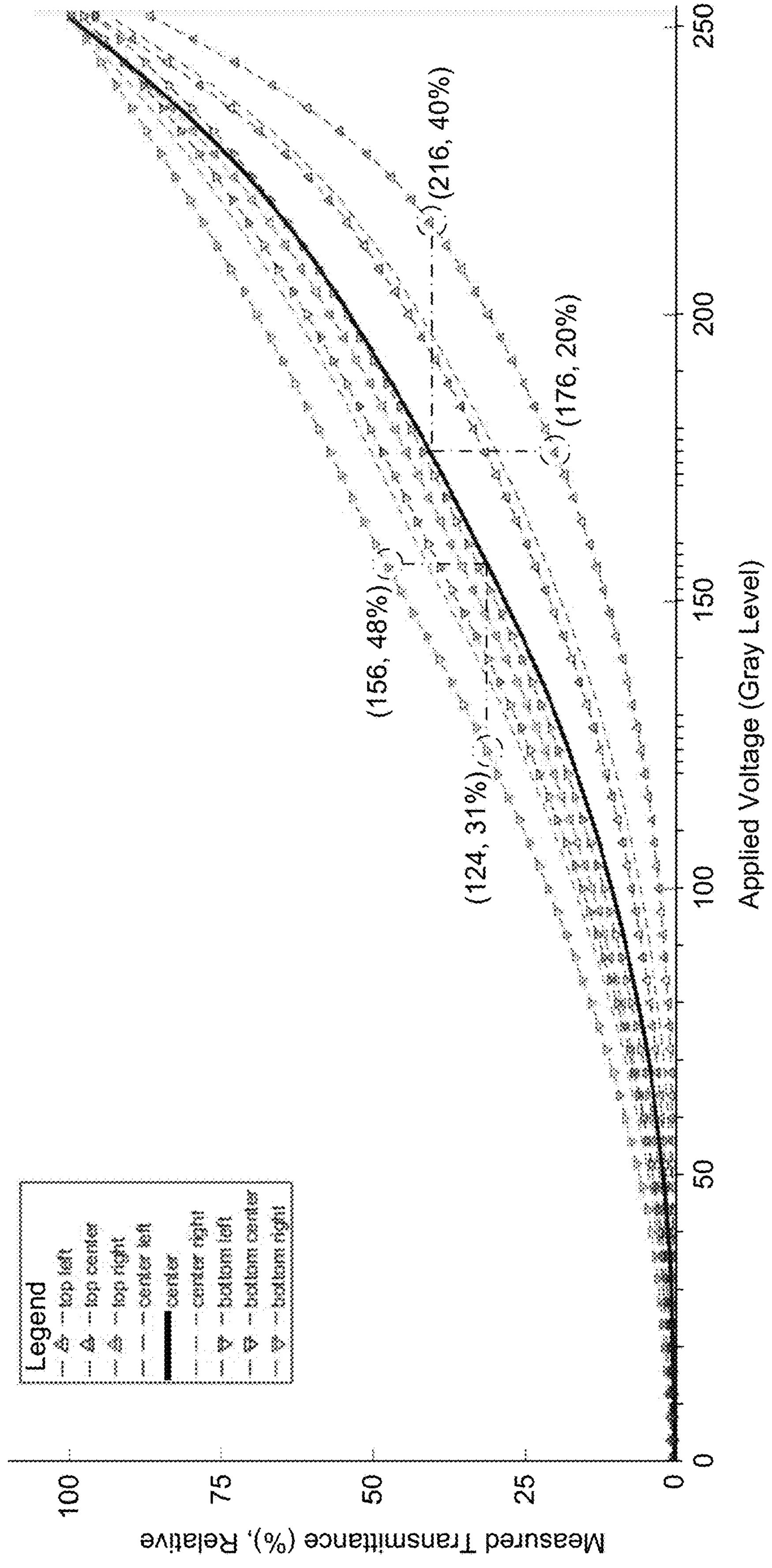
FIG. 6 provides a plot showing measured transmittance through different portions of a segment dimmer.

FIG. 6 provides data showing measured transmittance through an optical stack example including a segmented dimmer as a function of applied voltage for combinations of 3 different vertical (top, center, bottom) and 3 different horizontal (left, center, right) transmission angles, with data labeled "center" corresponding to on-axis transmittance. Here the applied voltage is represented as a gray level having values 0-255, where 0 corresponds to a maximum voltage applied to the dimmer to achieve 0% on-axis transmittance (fully dark state) and 255 corresponds to a zero voltage applied to the dimmer to achieve 100% (maximum) on-axis transmittance (fully clear state). As indicated in FIG. 6, some transmission angles provide a measured transmittance that is higher than the on-axis transmittance and some transmission angles provide a measured transmittance that is lower than the on-axis transmittance. In some cases, the transmittance for some transmission angles is higher than the on-axis transmittance at some gray levels and lower than the on-axis transmittance at other gray levels. Although data for only 9 different transmission angles are shown in FIG. 6, it will be appreciated that similar transmittance value curves for other transmission angles through the segmented dimmer can be similarly measured. Optionally, more or fewer transmittance value curves can be obtained in some cases. Further, for transmission angles through the segmented dimmer where measured transmittance value curves are not available, an interpolation between measured transmittance value curves can be applied to identify appropriate transmittance values.

FIG. 6 shows two examples for adjusting transmittance values to match on-axis transmittance values for two different transmission angles, one corresponding to a transmission angle from a pixel at the "top left" of the segmented dimmer and one corresponding to a transmission angle from a pixel at the "bottom right" of the segmented dimmer. As depicted, the measured transmittance values for the "top left" transmission angle are smaller than the center or on-axis transmittance values and the measured transmittance values for the "bottom right" transmission angle are larger than the center or on-axis transmittance values.

For example, to match the transmittance value for the "top left" transmission angle to the on-axis transmittance, a larger gray level (corresponding to a lower voltage) for the pixel having the "top left" transmission angle can be used. Specifically, when set at a voltage corresponding to a gray level of about 176, the pixel having the "top left" transmission angle exhibits a measured relative transmittance of about 20%, while the on-axis relative transmittance is about 40% at this voltage. To adjust the relative transmittance of the pixel having the "top left" transmission angle to 40%, a voltage corresponding to a gray level of about 216 may be used instead. As another example, to match the transmittance value for the pixel having the "bottom right" transmission angle to the on-axis transmittance, a smaller gray level (or higher voltage) for the pixel having the "bottom right" transmission angle can be used. Specifically, when set at a voltage corresponding to a gray level of about 156, the pixel having the "bottom right" transmission angle exhibits a measured relative transmittance of about 48%, while the on-axis relative transmittance is about 31% at this voltage. To adjust the relative transmittance of the pixel having the bottom right transmission angle to 31%, a voltage corresponding to a gray level of about 124 may be used.

Similar mappings between various transmission angles across the segmented dimmer and voltages or gray levels used to achieve a target transmittance may be compiled into a look-up table. Such a look-up table can be used to translate, for example, a desired or target transmittance and angular coordinates (e.g., a vertical angle and a horizontal angle) to a voltage or gray level for achieving such desired or target transmittance. In some cases interpolations between values in the look-up table may be used to render appropriate voltages or gray levels to achieve a target transmittance for one or more input transmission angles.

Since the segmented dimmer can exhibit angular variations in transmittance based on the position at which the transmitted light is received, it may be useful to know the eye position at which light transmitted through the segmented dimmer is to be received in order to determine the transmission angles for each pixel in the segmented dimmer to determine an appropriate mapping between transmission angles, a target transmittance, and voltage or gray level to apply to the pixels. An eye tracker may be coupled to or included with a wearable or AR device comprising a segmented dimmer to determine eye position. In some examples, an eye tracker comprises a camera or other optical sensor for sensing eye features and determining eye position, such as eyeball center position.

Figure 7:
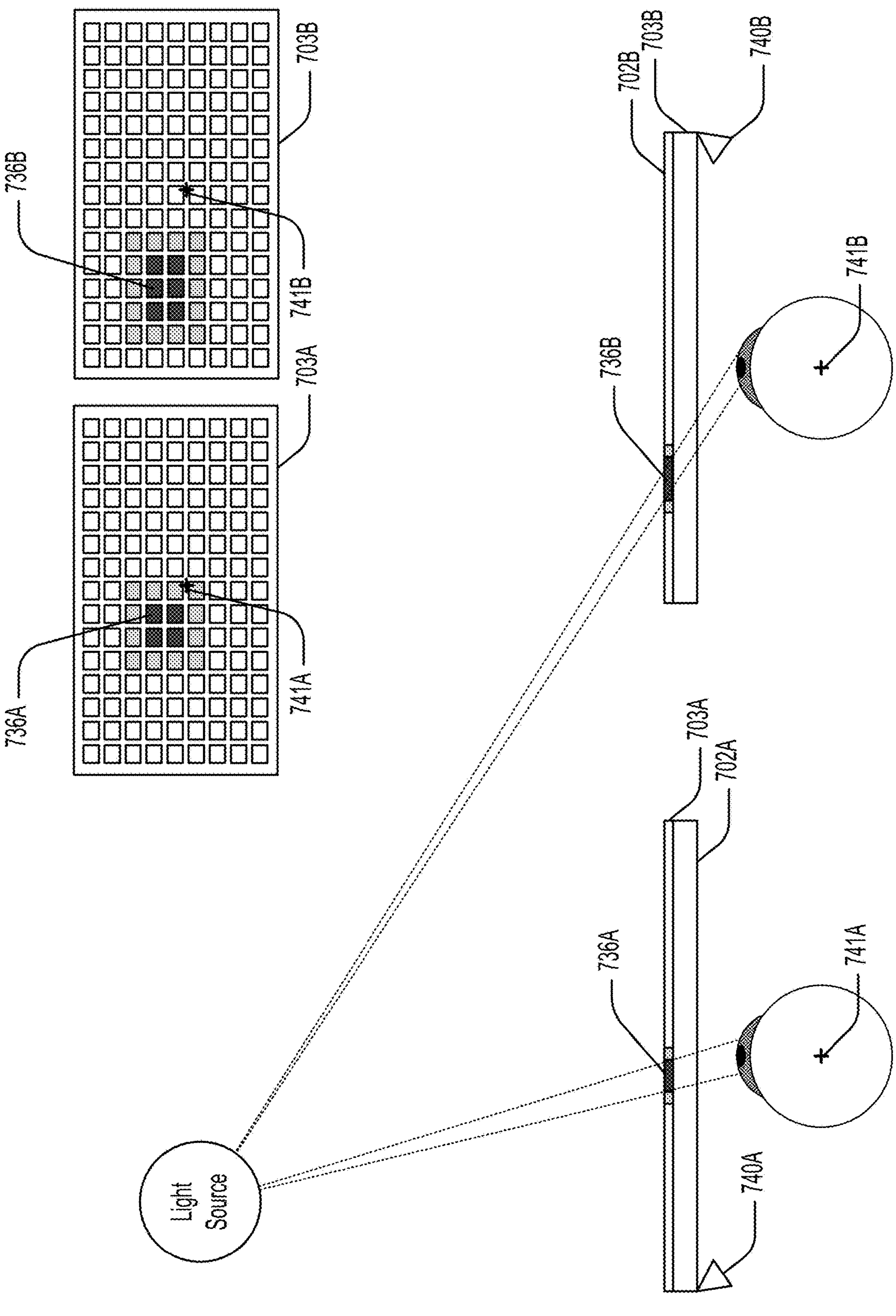
FIG. 7 illustrates an example where portions of a segmented dimmer are adjusted to reduce transmission through the dimmer.

FIG. 7 illustrates an example where dimming values may be determined for dimming portions of a segmented dimmer to reduce transmission from a light source. In the illustrated example, the wearable device includes a left dimmer 703A in alignment with a left eyepiece 702A and a right dimmer 703B in alignment with a right eyepiece 702B. While the example shows dimmers 703A and 703B as being positioned on the world side of eyepieces 702A and 702B, in some embodiments it may be desirable to position dimmers 703A and 703B on the user side of eyepieces 702A and 702B (on the side closest to the user's eyes).

The wearable device further includes left eye tracker 740A and right eye tracker 740B, which can determine eye position and/or gaze for use in determining appropriate transmittance levels for dimmers 703A and 703B, for example. FIG. 7 illustrates a left eye position 741A and a right eye position 741B. Based on eye positions 741A and 741B and known geometry and pixel locations for pixels of dimmers 703A and 703B, transmission angles as receipt coordinates for each pixel can be determined. In some examples, the transmission angles may be determined as a vertical angle and a horizontal angle (e.g., Cartesian-type angles) for each pixel. Other angular coordinate systems may be used, such as a Polar-type or cylindrical-type coordinate system in which the transmission angles for each pixel are determined as a radial angle (representing outward angle from on-axis transmission) and an azimuthal angle (representing position around on-axis transmission), or a spherical-type coordinate system in which transmission angles for each pixel are determined as an inclination or polar angle and an azimuthal angle. Use of angular geometries is not intended to be limiting, however, and Cartesian or other distance receipt coordinates can be alternatively or additionally determined and used, in some examples. In a specific example, with the eye positions 741A and 741B known, the relative on-axis distance to the left and right dimmers 703A and 703B can be determined, and using the known geometry of the left and right dimmers 703A and 703B, sets of receipt coordinates, such as transmission angles (e.g., vertical angle and horizontal angle), for each pixel can be determined using trigonometry.

In FIG. 7, a set of left-side angle dependent transmittance levels are determined for left dimmer 703A, forming dimmed area 736A, forming dimmed area 736B, so as to at least partially dim the world light emanating from the light source that is traveling toward the user's left and right eyes, respectively. To determine appropriate voltages to apply to the different pixels in dimmed areas 736A and 736B, a set of left-side voltage levels are determined for left dimmer 703A using the set of angles and angle dependent target transmittance levels for pixels of dimmed area 736A as inputs into one or more lookup tables, and a set of right-side voltage levels are determined for right dimmer 703B using the set of receipt coordinates (e.g., angles) and target transmittance levels for pixels of dimmed area 736B as inputs into one or more lookup tables. In some cases, the left-side voltages and/or right-side voltages may be offset, have a bias voltage added, or have a normalization factor applied to ensure that the observed transmittances from left to right match one another appropriately. For example, a bias level, offset level, or normalization factor may be identified for pairing a set of angle dependent transmittance levels to transmittance levels associated with a different segmented dimmer of another optical stack or optical system.

In some implementations, a plurality of lookup tables may be used, such as an individual lookup table for each angle dependent transmittance level. In some examples, some gray levels (e.g., close to 0) at low values may be unusable because they will be shifted to higher values to increase transmittance to match on-axis transmittance and similarly some gray levels at high values (e.g., close to 255) will be unusable because they will be needed shifted to lower values to decrease transmittance to match on-axis transmittance. Such examples may result in fewer than the full number of gray levels being available. Thus, in some examples, a smaller number of angle dependent transmittance levels may be used than there are available gray levels. Such configurations can also limit the number of lookup tables used. In the example described above with respect to FIG. 5, a fixed number of on-axis gray levels are used (e.g., representing a particular number of distinct voltages applied to the pixels of the segmented dimmer). To accommodate the highest and lowest gray levels being shifted, as described above, a reduced number of angle dependent transmittance levels may be used, where each angle dependent transmittance levels may encompass one or more on-axis gray levels.

Although not shown in FIG. 6, measured transmittance levels may also vary as a function of temperature, and so it may also be desirable to produce and use lookup tables for angle dependent transmittance levels as a function of temperature. In such examples, a temperature sensor may be included in a wearable device and used to identify lookup tables suitable for use in rendering a set of voltages to apply to pixels of a segmented dimmer.

Other components of a wearable or AR device or device incorporating a segmented dimmer may be used beyond those shown in the examples described herein. U.S. patent application Ser. No. 16/557,706, filed on Aug. 30, 2019, and now issued as U.S. Pat. No. 11,170,565, provides additional details of a wearable device comprising a segmented dimmer, and is hereby incorporated by reference in its entirety.

Figure 8:
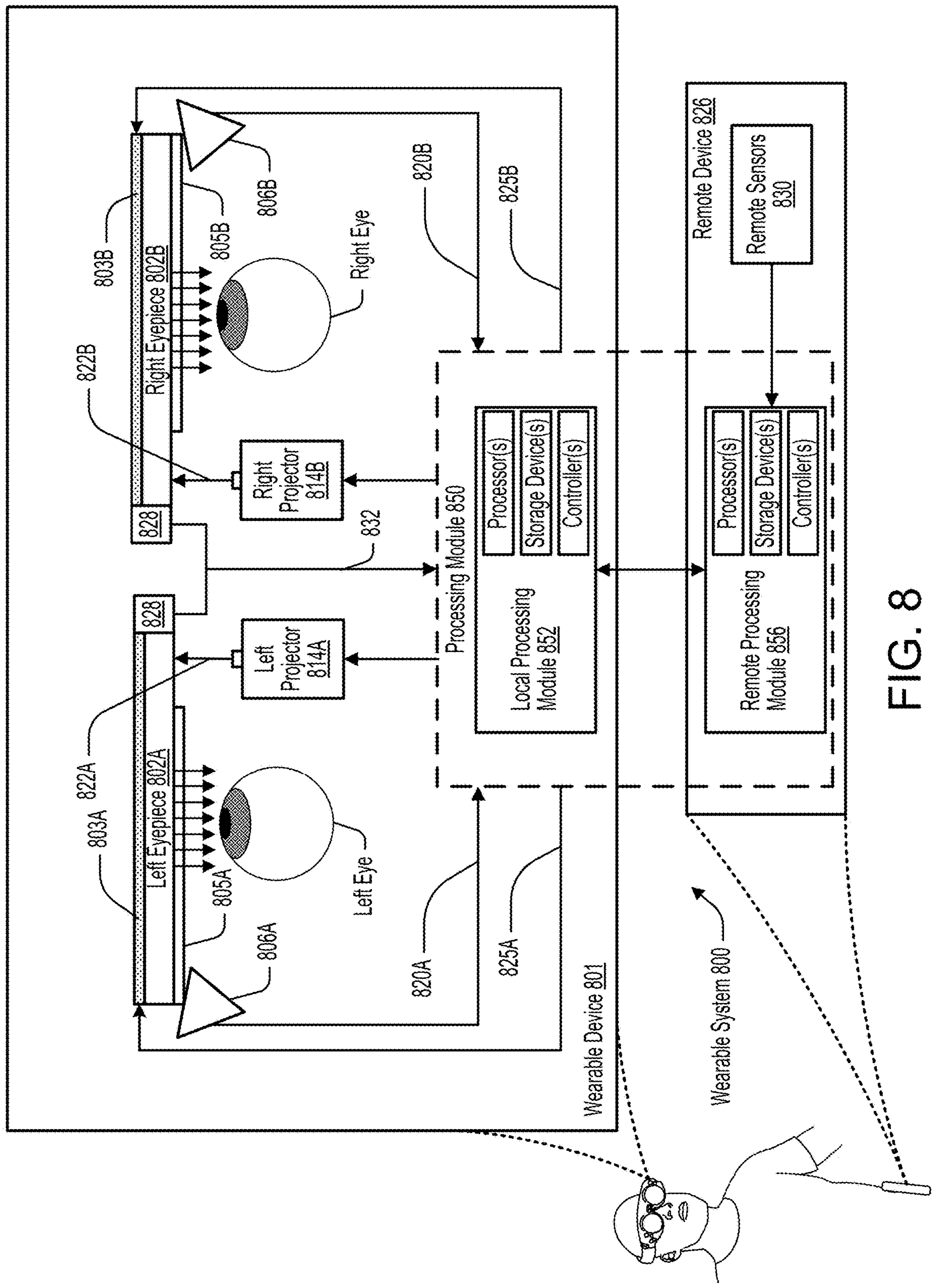
FIG. 8 illustrates a schematic view of an example wearable system.

FIG. 8 illustrates a schematic view of an example wearable system 800, according to some embodiments of the present disclosure. Wearable system 800 may include a wearable device 801 and at least one remote device 826 that is remote from wearable device 801 (e.g., separate hardware but communicatively coupled). Wearable system 800 may alternatively be referred to as an "optical system", and wearable device 801 may alternatively be referred to as an "optical device". While wearable device 801 is worn by a user (generally as a headset), remote device 826 may be held by the user (e.g., as a handheld controller) or mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Wearable device 801 may include a left eyepiece 802A, a left lens assembly 805A, and a left segmented dimmer 803A arranged in a side-by-side configuration and constituting a left optical stack. Left lens assembly 805A may include an accommodating lens on the user side of the left optical stack as well as a compensating lens on the world side of the left optical stack. Similarly, wearable device 801 may include a right eyepiece 802B, a right lens assembly 805B, and a right segmented dimmer 803B arranged in a side-by-side configuration and constituting a right optical stack. Right lens assembly 805B may include an accommodating lens on the user side of the right optical stack as well as a compensating lens on the world side of the right optical stack.

In some embodiments, wearable device 801 includes one or more sensors including, but not limited to: a left eye-box camera 806A attached directly to or near left eyepiece 802A, a right eye-box camera 806B attached directly to or near right eyepiece 802B, and one or more temperature sensors 828 attached to or between eyepieces 802. Eye-box cameras 806A and 806B may be or comprise eye trackers or other devices for determining an eye position of the left eye and the right eye of the user. Wearable device 801 may include one or more image projection devices such as a left projector 814A optically linked to left eyepiece 802A and a right projector 814B optically linked to right eyepiece 802B.

Wearable system 800 may include a processing module 850 for collecting, processing, and/or controlling data and hardware within the system. Components of processing module 850 may be distributed between wearable device 801 and remote device 803. For example, processing module 850 may include a local processing module 852 on the wearable portion of wearable system 800 and a remote processing module 856 physically separate from and communicatively linked to local processing module 852. Each of local processing module 852 and remote processing module 856 may include one or more processing units (e.g., central processing units (CPUs), graphics processing units (GPUs), etc.), controllers (e.g., voltage controllers, projector controllers, etc.) and one or more storage devices, such as non-volatile memory (e.g., flash memory).

Processing module 850 may collect the data captured by various sensors of wearable system 800, such as cameras 806A and 806B, temperature sensor(s) 828, remote sensors 830, ambient light sensors, microphones, world cameras, inertial measurement units (IMUs), accelerometers, compasses, Global Navigation Satellite System (GNSS) units, radio devices, and/or gyroscopes. For example, processing module 850 may receive image(s) 820A and 820B from cameras 806A and 806B. Specifically, processing module 850 may receive eye-box image(s) 820A from left eye-box camera 806A, right eye-box image(s) 820B from right eye-box camera 806B. In some embodiments, image(s) 820A and 820B may include a single image, a pair of images, a video comprising a stream of images, a video comprising a stream of paired images, and the like. Image(s) 820A and 820B may be periodically generated and sent to processing module 850 while wearable system 800 is powered on, or may be generated in response to an instruction sent by processing module 850 to one or more of the cameras.

In some embodiments, processing module 850 may receive ambient light information from an ambient light sensor. The ambient light information may indicate a brightness value or a range of spatially-resolved brightness values. Temperature sensor(s) 828 may capture temperatures of optical stacks or components thereof, such as left segmented dimmer 803A and right segmented dimmer 803B. As another example, processing module 850 may receive projected image brightness values from one or both of projectors 814. Remote sensors 830 located within remote device 826 may include any of the above-described sensors with similar functionality, or different sensors.

Virtual content is delivered to the user of wearable system 800 using projectors 814 and eyepieces 802, along with other components in the optical stacks. For instance, eyepieces 802A, 802B may comprise transparent or semi-transparent waveguides configured to direct and outcouple light generated by projectors 814A, 814B, respectively. Specifically, processing module 850 may cause left projector 814A to output left virtual image light 822A onto left eyepiece 802A, and may cause right projector 814B to output right virtual image light 822B onto right eyepiece 802B. In some embodiments, projectors 814 may include micro-electromechanical system (MEMS) spatial light modulator (SLM) scanning devices. In some embodiments, each of eyepieces 802A, 802B may comprise a plurality of waveguides corresponding to different colors. In some embodiments, lens assemblies 805A, 805B may be coupled to and/or integrated with eyepieces 802A, 802B. For example, lens assemblies 805A, 805B may be incorporated into a multi-layer eyepiece and may form one or more layers that make up one of eyepieces 802A, 802B.

Voltages 825A may be provided by processing module 850 to left segmented dimmer 803A and voltages 825B may be provided by processing module 850 to right segmented dimmer 803B. Voltages 825A and 825B may be determined using a variety of information, as described above. For example, voltages 825A may be determined using a position of the left eye as determined by left eye-box camera 806A and optionally temperature data 832 from temperature sensor 828 and voltages 825B may be determined using a position of the right eye as determined by right eye-box camera 806B and optionally temperature data 832 from temperature sensor 828. Voltages 825A may be determined by using receipt coordinates (e.g., transmission angles) associated with each pixel of left segmented dimmer 803A, determined based on a position of the left eye. Similarly, voltages 825B may be determined by using angles associated with each pixel of right segmented dimmer 803B, determined based on a position of the right eye. Processing module 850 may determine voltages 825A and 825B using one or more transmittance lookup tables including angular voltage information and/or temperature-dependent transmittance lookup tables.

Figure 9:
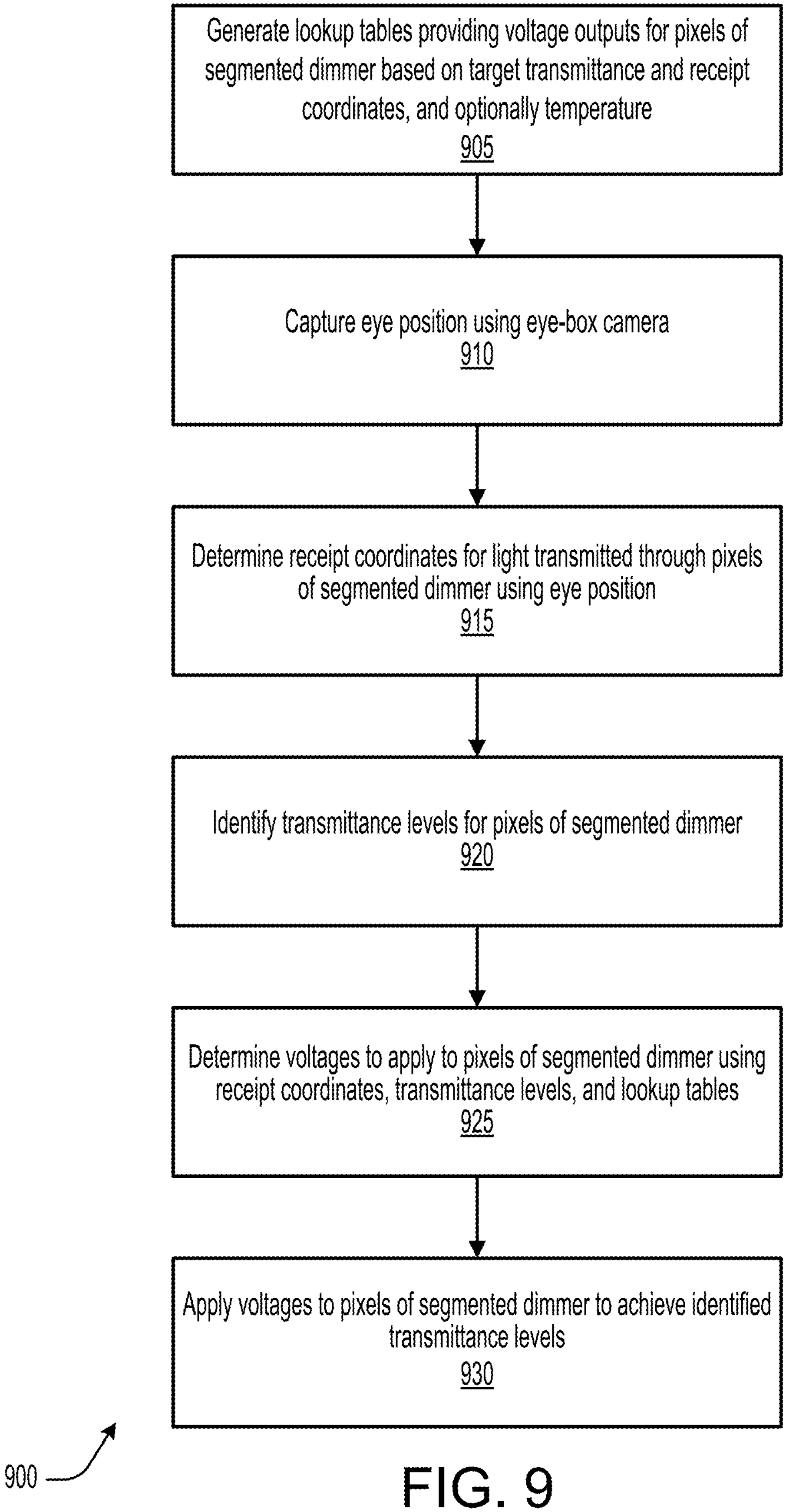
FIG. 9 illustrates a method of operating an optical system.

FIG. 9 illustrates a method 900 of operating an optical system, in accordance with some examples of the present disclosure. One or more steps of method 900 may be omitted during performance of method 900, and steps of method 900 may be performed in any order and/or in parallel. One or more steps of method 900 may be repeated one or more times during operation. One or more steps of method 900 may be performed by one or more processors, such as those included in the optical system. Method 900 may be implemented as a computer-readable medium or computer program product comprising instructions which, when the program is executed by one or more computers, cause the one or more computers to carry out the steps of method 900.

An optical system described in relation to method 900 may correspond to a wearable system (e.g., wearable system 800) and/or a wearable device (e.g., wearable devices 101, 201, 301, 801) as described in various embodiments. The optical system described in relation to method 900 may be a display device such as an AR device or, in some examples, the optical system may be device without capabilities to display virtual content, such as a pair of sunglasses. The optical system may include one or more segmented dimmers (e.g., dimmers 203, 303, 703A, 703B, 803B, 803B). The optical system may be configured to receive world light (e.g., world light 132, 232) associated with a world object (e.g., world objects 130, 230) at each of the segmented dimmers and use the segmented dimmers to reduce a transmittance of the world light according to a spatial dimming technique as described herein.

At step 905, a plurality of lookup tables may be generated for providing output voltages for pixels of a segmented dimmer based on target transmittance levels and receipt coordinates for receiving light transmitted through the pixels of segmented dimmer. As described above, different lookup tables may be generated for different target transmittance levels, with each lookup table providing for conversion of receipt coordinates (e.g., angle coordinates) to voltages for providing the target transmittance. Step 905 may, for example, correspond to a calibration or data collection step in which a segmented dimmer is tested to determine its performance characteristics, such as using a data collection configuration 500 as depicted in FIG. 5, to identify actual angular transmittance levels as a function of applied pixel voltage to allow for determination of the plurality of lookup tables. In some examples, step 905 may optionally include controlling a temperature of the segmented dimmer during data collection to generate lookup tables for a plurality of temperatures and a plurality of target transmittance levels.

At step 910, an eye position may be captured or determined using an eye tracker or eye-box camera, to allow for determination of receipt coordinates (e.g., transmission angles) at step 915 for receiving light transmitted through each pixel of the segmented dimmer by the eye of a user of the wearable system or wearable device. In this way, appropriate angle information can be used for the user, which may change depending on a particular user and/or a particular position or fit of the wearable device on a head of the user. In some cases, where eye trackers or eye-box cameras are not used, the eye position may be set as a fixed value and so capturing eye position at step 910 may be an optional step, such that the receipt coordinates may also be fixed values. In some cases, eye trackers or eye-box cameras may be used for not only determining eye position for identifying receipt coordinates for transmitted light, as described herein, but may also be used to determine gaze information for other purposes, for example.

At step 920, target transmittance levels for the pixels of the segmented dimmer may be determined. As described above, the target transmittance levels may be determined for dimming portions of the segmented dimmer to reduce world light from transmitting therethrough, such as to reduce an intensity associated with bright world objects or to reduce an amount of world light to permit virtual content generated by the wearable device from being washed out. U.S. patent application Ser. No. 16/557,706, filed on Aug. 30, 2019, and now issued as U.S. Pat. No. 11,170,565, hereby incorporated by reference in its entirety, provides additional details of a determining dimming or transmittance levels for pixels of segmented dimmer, and the techniques described therein may be applied for determining target transmittance levels.

At step 925, voltages for applying to pixels of the segmented dimmer may be determined. The voltages may be determined using the set of receipt coordinates for each pixel, as determined at step 915, using the lookup tables determined at step 905, and using the target transmittance levels determined at step 920. For example, the target transmittance level for each pixel may be used to determine which lookup table to use for that pixel, as each lookup table may be associated with a target transmittance level. Similarly, a temperature, may optionally be used in combination with a target transmittance level to determine which lookup table to use for that pixel, as each lookup table may be associated with a target transmittance level and a temperature or temperature range. With the appropriate lookup table identified, the receipt coordinates may be applied to the lookup table to determine a voltage for application to the pixel to achieve the target transmittance. Such process may be repeated for each pixel or for a group of pixels, in some cases.

With an appropriate set of voltages identified for each pixel of the segmented dimmer, at step 930, the voltages may be applied to the pixels of the segmented dimmer achieve the target transmittance levels appropriate for each pixel, which are angularly corrected by this method.

Figure 10:
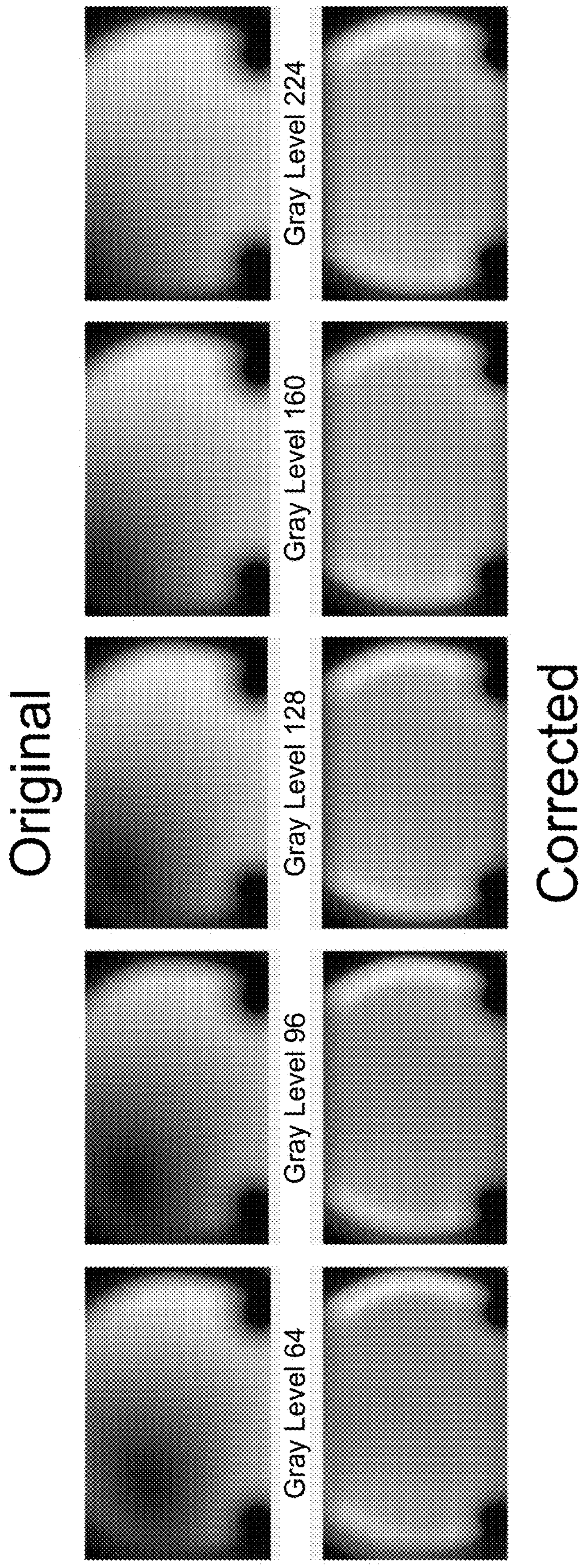
FIG. 10 provides luminance images of a segmented dimmer with and without angular variation corrections applied.

FIG. 10 shows examples of luminance images collected by a camera in a data collection configuration as shown in FIG. 5 when a segmented dimmer is set to a series of different on-axis transmittance levels (e.g., gray levels corresponding to 64, 128, 160, and 224 on a scale of 0-255) showing uncorrected images in the top row and corrected images where the applied voltages are adjusted to establish a more uniform transmittance across the segmented dimmer as described herein. Overall, the corrected images show a significantly more uniform correction near the center of the segmented dimmer, though some artifacts may still be observed.

Figure 11:
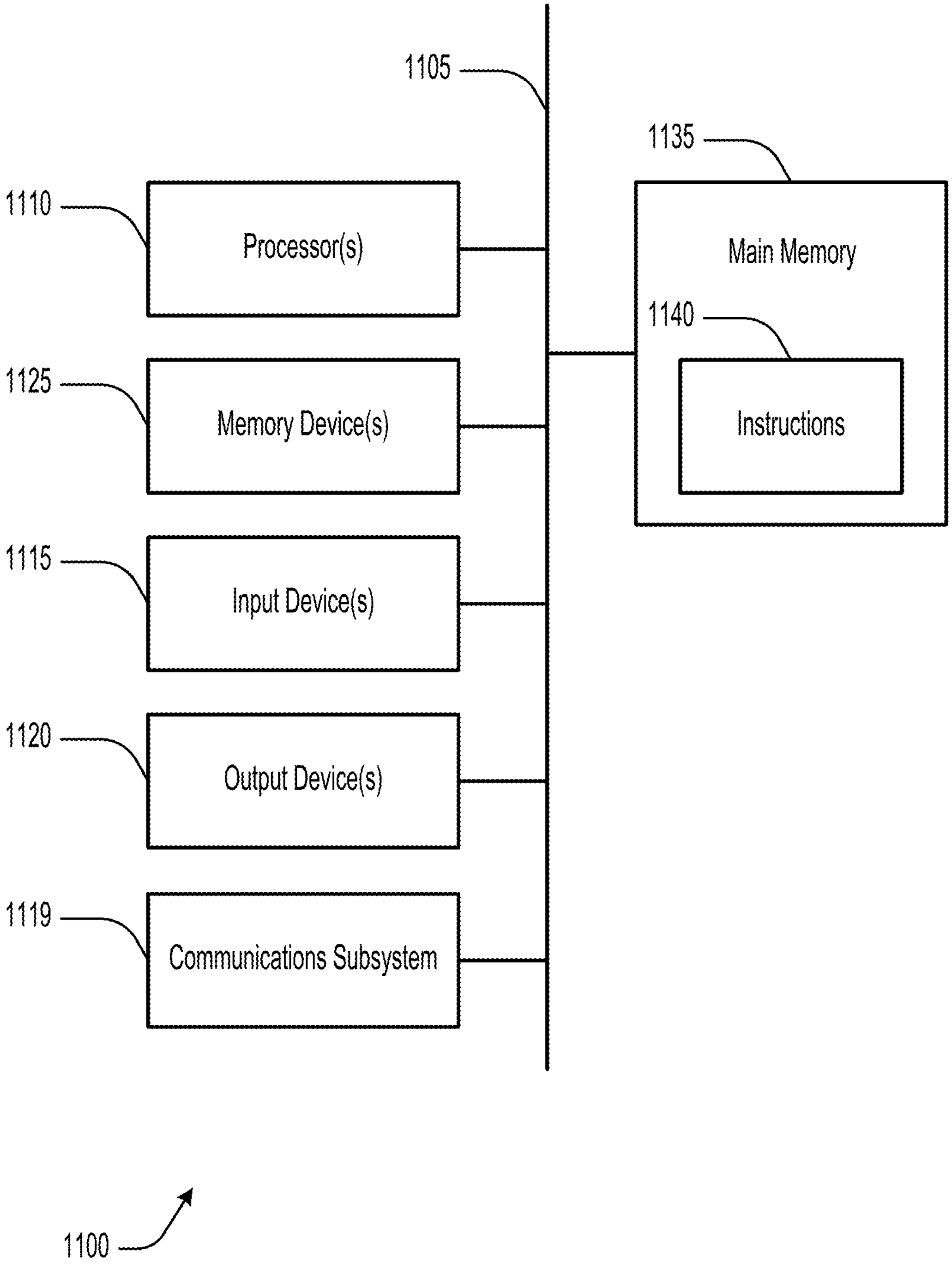
FIG. 11 illustrates an example computer system comprising various hardware elements.

FIG. 11 illustrates an example computer system 1100 comprising various hardware elements, in accordance with some embodiments of the present disclosure. Computer system 1100 may be incorporated into or integrated with devices described herein and/or may be configured to perform some or all of the steps of the methods provided by various embodiments. For example, in various embodiments, computer system 1100 may be incorporated into wearable system 800 and/or may be configured to perform method 900. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

In the illustrated example, computer system 1100 includes a communication medium 1105, one or more processor(s) 1110, one or more input device(s) 1115, one or more output device(s) 1120, a communications subsystem 1119, and one or more memory device(s) 1125. Computer system 1100 may be implemented using various hardware implementations and embedded system technologies. For example, one or more elements of computer system 1100 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 1100 may be communicatively coupled via communication medium 1105. While communication medium 1105 is illustrated as a single connection for purposes of clarity, it should be understood that communication medium 1105 may include various numbers and types of communication media for transferring data between hardware elements. For example, communication medium 1105 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1105 may include one or more buses connecting pins of the hardware elements of computer system 1100. For example, communication medium 1105 may include a bus that connects processor(s) 1110 with main memory 1135, referred to as a system bus, and a bus that connects main memory 1135 with input device(s) 1115 or output device(s) 1120, referred to as an expansion bus. The system bus may itself consist of several buses, including an address bus, a data bus, and a control bus. The address bus may carry a memory address from processor(s) 1110 to the address bus circuitry associated with main memory 1135 in order for the data bus to access and carry the data contained at the memory address back to processor(s) 1110. The control bus may carry commands from processor(s) 1110 and return status signals from main memory 1135. Each bus may include multiple wires for carrying multiple bits of information and each bus may support serial or parallel transmission of data.

Processor(s) 1110 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 1110 may include one or more multi-core processors, in which each core may read and execute program instructions concurrently with the other cores, increasing speed for programs that support multithreading.

Input device(s) 1115 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 1115 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1120 may include one or more of various devices that convert information into human-readable form, such as without limitation a display device, a speaker, a printer, a haptic or tactile device, and/or the like. Output device(s) 1120 may also include devices for writing to removable storage devices or other removable media, such as those described in reference to input device(s) 1115. Output device(s) 1120 may also include various actuators for causing physical movement of one or more components. Such actuators may be hydraulic, pneumatic, electric, and may be controlled using control signals generated by computer system 1119.

Communications subsystem 1119 may include hardware components for connecting computer system 1100 to systems or devices that are located external to computer system 1100, such as over a computer network. In various embodiments, communications subsystem 1119 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1125 may include the various data storage devices of computer system 1100. For example, memory device(s) 1125 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 1110 and memory device(s) 1125 are illustrated as being separate elements, it should be understood that processor(s) 1110 may include varying levels of on-processor memory, such as processor registers and caches that may be utilized by a single processor or shared between multiple processors.

Memory device(s) 1125 may include main memory 1135, which may be directly accessible by processor(s) 1110 via the memory bus of communication medium 1105. For example, processor(s) 1110 may continuously read and execute instructions stored in main memory 1135. As such, various software elements may be loaded into main memory 1135 to be read and executed by processor(s) 1110 as illustrated in FIG. 11. Typically, main memory 1135 is volatile memory, which loses all data when power is turned off and accordingly needs power to preserve stored data. Main memory 1135 may further include a small portion of non-volatile memory containing software (e.g., firmware, such as BIOS) that is used for reading other software stored in memory device(s) 1125 into main memory 1135. In some embodiments, the volatile memory of main memory 1135 is implemented as RAM, such as dynamic random-access memory (DRAM), and the non-volatile memory of main memory 1135 is implemented as read-only memory (ROM), such as flash memory, erasable programmable read-only memory (EPROM), or electrically erasable programmable read-only memory (EEPROM).

Computer system 1100 may include software elements, shown as being currently located within main memory 1135, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 1140, which are executable by computer system 1100. In one example, such instructions 1140 may be received by computer system 1100 using communications subsystem 1119 (e.g., via a wireless or wired signal that carries instructions 1140), carried by communication medium 1105 to memory device(s) 1125, stored within memory device(s) 1125, read into main memory 1135, and executed by processor(s) 1110 to perform one or more steps of the described methods. In another example, instructions 1140 may be received by computer system 1100 using input device(s) 1115 (e.g., via a reader for removable media), carried by communication medium 1105 to memory device(s) 1125, stored within memory device(s) 1125, read into main memory 1135, and executed by processor(s) 1110 to perform one or more steps of the described methods.

In some embodiments of the present disclosure, instructions 1140 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 1100. For example, the non-transitory computer-readable medium may be one of memory device(s) 1125 (as shown in FIG. 11). In some cases, the non-transitory computer-readable medium may be separate from computer system 1100. In one example, the non-transitory computer-readable medium may be a removable medium provided to input device(s) 1115 (as shown in FIG. 11), such as those described in reference to input device(s) 1115, with instructions 1140 being read into computer system 1100 by input device(s) 1115. In another example, the non-transitory computer-readable medium may be a component of a remote electronic device, such as a mobile phone, that may wirelessly transmit a data signal that carries instructions 1140 to computer system 1100 and that is received by communications subsystem 1119 (as shown in FIG. 11).

Instructions 1140 may take any suitable form to be read and/or executed by computer system 1100. For example, instructions 1140 may be source code (written in a human-readable programming language such as Java, C, C++, C #, Python), object code, assembly language, machine code, microcode, executable code, and/or the like. In one example, instructions 1140 are provided to computer system 1100 in the form of source code, and a compiler is used to translate instructions 1140 from source code to machine code, which may then be read into main memory 1135 for execution by processor(s) 1110. As another example, instructions 1140 are provided to computer system 1100 in the form of an executable file with machine code that may immediately be read into main memory 1135 for execution by processor(s) 1110. In various examples, instructions 1140 may be provided to computer system 1100 in encrypted or unencrypted form, compressed or uncompressed form, as an installation package or an initialization for a broader software deployment, among other possibilities.

In one aspect of the present disclosure, a system (e.g., computer system 1100) is provided to perform methods in accordance with various embodiments of the present disclosure. For example, some embodiments may include a system comprising one or more processors (e.g., processor(s) 1110) that are communicatively coupled to a non-transitory computer-readable medium (e.g., memory device(s) 1125 or main memory 1135). The non-transitory computer-readable medium may have instructions (e.g., instructions 1140) stored therein that, when executed by the one or more processors, cause the one or more processors to perform the methods described in the various embodiments.

In another aspect of the present disclosure, a computer-program product that includes instructions (e.g., instructions 1140) is provided to perform methods in accordance with various embodiments of the present disclosure. The computer-program product may be tangibly embodied in a non-transitory computer-readable medium (e.g., memory device(s) 1125 or main memory 1135). The instructions may be configured to cause one or more processors (e.g., processor(s) 1110) to perform the methods described in the various embodiments.

In another aspect of the present disclosure, a non-transitory computer-readable medium (e.g., memory device(s) 1125 or main memory 1135) is provided. The non-transitory computer-readable medium may have instructions (e.g., instructions 1140) stored therein that, when executed by one or more processors (e.g., processor(s) 1110), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms “a”, “an”, and “the” include plural references unless the context clearly dictates otherwise. Thus, for example, reference to “a user” includes reference to one or more of such users, and reference to “a processor” includes reference to one or more processors and equivalents thereof known to those skilled in the art, and so forth.

Also, the words “comprise,” “comprising,” “contains,” “containing,” “include,” “including,” and “includes,” when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating an optical system, the method comprising:

identifying a set of angle dependent transmittance levels for world light passing through pixels of a segmented dimmer exhibiting viewing angle transmittance variations for application of a same voltage to all pixels of the segmented dimmer;

projecting virtual image light out of an eyepiece of the optical system toward an eye of a user;

determining an eye position of the eye of the user for determining, for each pixel of the segmented dimmer, receipt coordinates including a first angular coordinate and a second angular coordinate with respect to the eye of the user for receiving the world light passing through each pixel of the segmented dimmer;

determining a set of voltages to apply to pixels of the segmented dimmer, wherein determining the set of voltages includes using the receipt coordinates and the set of angle dependent transmittance levels to determine, for each pixel, a voltage output; and applying the set of voltages to the pixels of the segmented dimmer to achieve world light transmittance through the segmented dimmer corresponding to the set of angle dependent transmittance levels while the virtual image light is observed by the user.

2. The method of claim 1, wherein rendering the set of voltages comprises using one or more lookup tables based on the receipt coordinates, wherein a lookup table is associated with a corresponding angle dependent transmittance level.

3. The method of claim 1, wherein the receipt coordinates further include one or more distance coordinates.

4. The method of claim 1, wherein determining the set of voltages includes:

applying, for each pixel, the first angular coordinate and the second angular coordinate to a lookup table associated with an angle dependent transmittance level for the pixel to determine an output voltage to apply to the pixel.

5. The method of claim 1, wherein a set of voltages comprises voltages for each of the pixels of the segmented dimmer.

6. The method of claim 1, wherein the set of angle dependent transmittance levels is a same level for all pixels of the segmented dimmer.

7. The method of claim 1, wherein the set of angle dependent transmittance levels includes independent transmittance levels for different pixels of the segmented dimmer.

8. The method of claim 1, further comprising determining a temperature of the segmented dimmer, wherein determining the set of voltages includes using the set of angle dependent transmittance levels and the temperature.

9. The method of claim 1, further comprising, for each of a plurality of different angle dependent transmittance levels, generating a lookup table providing voltage outputs for different pixels of the segmented dimmer as a function of receipt coordinates of light transmitted through the different pixels of the segmented dimmer to achieve the set of angle dependent transmittance levels.

10. The method of claim 1, further comprising, for each of a plurality of different angle dependent transmittance levels and different temperatures, generating a lookup table providing voltage outputs for different pixels of the segmented dimmer as a function of receipt coordinates of light transmitted through the different pixels of the segmented dimmer and temperature to achieve the set of angle dependent transmittance levels.

11. The method of claim 1, wherein the segmented dimmer comprises a right eye segmented dimmer associated with the eye of the user and a left eye segmented dimmer associated with a left eye of the user, wherein the eyepiece comprises a right eyepiece aligned with the right eye segmented dimmer and a left eyepiece aligned with the left eye segmented dimmer, wherein the method further comprises:

determining, from the set of voltages, a first subset of voltages corresponding to the right eye segmented dimmer and a second subset of voltages corresponding to the left eye segmented dimmer, wherein the first subset of voltages comprise an offset with respect to the second subset of voltages due to a difference in transmission angles of world light with respect to a right eye and a left eye of the user;

applying the first subset of voltages to pixels of the right eye segmented dimmer; and applying the second subset of voltages to pixels of the left eye segmented dimmer, wherein the second subset of voltages are normalized with respect to the first subset of voltages based on the offset.

12. An optical system comprising:

a segmented dimmer including a plurality of pixels, the segmented dimmer exhibiting viewing angle transmittance variations for application of a same voltage to all pixels of the segmented dimmer;

a voltage controller in electrical communication with the segmented dimmer and configured to provide a set of voltages to pixels of the segmented dimmer to control transmittance levels for world light passing through the pixels of the segmented dimmer;

one or more processors programmed with instructions that, when executed, cause the one or more processors to perform operations including:

projecting virtual image light out of an eyepiece of the optical system toward an eye of a user of the optical system;

identifying a receiver position, wherein the receiver position corresponds to an eye position of the eye of the user of the optical system and includes, for each pixel of the segmented dimmer, receipt coordinates including a first angular coordinate and a second angular coordinate with respect to the eye of the user for receiving the world light passing through each pixel of the segmented dimmer;

identifying a set of angle dependent transmittance levels for the world light passing through pixels of the segmented dimmer;

determining a set of voltages to apply to pixels of the segmented dimmer, wherein determining the set of voltages includes using the receipt coordinates and the set of angle dependent transmittance levels to determine, for each pixel, a voltage output; and controlling the voltage controller to apply the set of voltages to the pixels of the segmented dimmer, wherein the virtual image light is observed by the user of the optical system while the world light is passing through pixels of the segmented dimmer.

13. The optical system of claim 12, wherein rendering the set of voltages comprises using one or more lookup tables based on the receipt coordinates, wherein a lookup table is associated with a corresponding angle dependent transmittance level.

14. The optical system of claim 13, wherein the receipt coordinates further include one or more distance coordinates.

15. The optical system of claim 12, wherein determining the set of voltages includes:

applying, for each pixel, the first angular coordinate and the second angular coordinate to a lookup table associated with an angle dependent transmittance level for the pixel to determine an output voltage to apply to the pixel.

16. The optical system of claim 12, wherein a set of voltages comprises voltages for each of the pixels of the segmented dimmer.

17. The optical system of claim 12, wherein identifying the set of angle dependent transmittance levels comprises identifying a bias level, offset level, or normalization factor for reducing dichoptic luminance errors or for pairing the set of angle dependent transmittance levels to transmittance levels associated with a different segmented dimmer of a different optical system.

18. The optical system of claim 12, wherein the operations further include determining a temperature of the segmented dimmer, wherein determining the set of voltages includes using the set of angle dependent transmittance levels and the temperature.

19. The optical system of claim 18, wherein determining the set of voltages comprises determining receipt coordinates associated with the pixels of the segmented dimmer and rendering the set of voltages using one or more lookup tables based on the receipt coordinates, wherein a lookup table is associated with a corresponding angle dependent transmittance level at the temperature.

20. The optical system of claim 12, wherein the segmented dimmer comprises a right eye segmented dimmer associated with the eye of the user and a left eye segmented dimmer associated with a left eye of the user, wherein the eyepiece comprises a right eyepiece aligned with the right eye segmented dimmer and a left eyepiece aligned with the left eye segmented dimmer, and wherein the operations further include:

determining, from the set of voltages, a first subset of voltages corresponding to the right eye segmented dimmer and a second subset of voltages corresponding to the left eye segmented dimmer, wherein the first subset of voltages comprise an offset with respect to the second subset of voltages due to a difference in transmission angles of world light with respect to a right eye and a left eye of the user;

controlling the voltage controller to apply the first subset of voltages to pixels of the right eye segmented dimmer; and controlling the voltage controller to apply the second subset of voltages to pixels of the left eye segmented dimmer, wherein the second subset of voltages are normalized with respect to the first subset of voltages based on the offset.

* * * * *